US008560762B2

(12) United States Patent
Panabaker et al.

(10) Patent No.: US 8,560,762 B2
(45) Date of Patent: Oct. 15, 2013

(54) LIMITED MEMORY POWER (75) Inventors: Ruston Panabaker, Redmond, WA (US); Robert Patrick Fitzgerald, Fall City, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 744 days.

(21) Appl. No.: 12/146,239

(22) Filed: Jun. 25, 2008

(65) Prior Publication Data
US 2009/0327579 A1 Dec. 31, 2009

(51) Int. Cl.
*G06F 12/00* (2006.01)

(52) U.S. Cl.
USPC .............. 711/103; 365/185.33; 711/E12.084

(58) Field of Classification Search
USPC .................................. 711/103, 154
See application file for complete search history.

(56) References Cited

U.S. PATENT DOCUMENTS

| | | | |
|---|---|---|---|
| 5,268,870 A | 12/1993 | Harari | |
| 5,644,636 A * | 7/1997 | Fernandez | 711/163 |
| 5,793,673 A | 8/1998 | Pio et al. | |
| 5,862,081 A | 1/1999 | Harari | |
| 6,188,604 B1 | 2/2001 | Liu et al. | |
| 6,993,130 B1 * | 1/2006 | Fernandez et al. | 380/46 |
| 7,050,334 B2 | 5/2006 | Kim et al. | |
| 7,080,192 B1 | 7/2006 | Wong | |
| 7,279,740 B2 | 10/2007 | Bhattacharyya et al. | |
| 2004/0015649 A1 | 1/2004 | Chang | |
| 2004/0088511 A1 * | 5/2004 | Bacon et al. | 711/167 |
| 2005/0273548 A1 * | 12/2005 | Roohparvar | 711/103 |
| 2006/0161728 A1 | 7/2006 | Bennett et al. | |
| 2006/0258090 A1 | 11/2006 | Bhattacharyya et al. | |
| 2006/0265545 A1 * | 11/2006 | Entani | 711/103 |
| 2008/0270730 A1 * | 10/2008 | Lasser et al. | 711/170 |
| 2008/0291724 A1 * | 11/2008 | Litsyn et al. | 365/185.03 |
| 2008/0313493 A1 * | 12/2008 | Roohparvar et al. | 714/6 |
| 2009/0157948 A1 * | 6/2009 | Trichina et al. | 711/103 |

OTHER PUBLICATIONS

Kevin Morris. Flash Flood Inside FPGAs' Non-volatile Companions, FPGA and Structured ASIC Journal, Aug. 14, 2007. http://www.fpgajournal.com/articles_2007/20070814_flash.htm. Last accessed Oct. 25, 2007, 3 pages.
Arie Tal, et al. Examining NAND Flash Alternatives for Mobiles: Part 1, Oct. 22, 2003. http://www.commsdesign.com/article/printableArticle.jhtml?articleID=16502199. Last accessed Oct. 25, 2007, 5 pages.
Matthew Merritt, et al. Flash Memory: The Electronic Storage of the Future, Paper # 7058, Conference Session # B5, Seventh Annual Freshman Conference, Apr. 14, 2007. http://fie.engrng.pitt.edu/eng12/Author/final/7058.doc. Last accessed Oct. 25, 2007, 6 pages.

* cited by examiner

*Primary Examiner* — Edward Dudek, Jr.
*Assistant Examiner* — Sean D Rossiter
(74) *Attorney, Agent, or Firm* — Lee & Hayes, PLLC (57) ABSTRACT

Storage devices can retain information through application of a charge upon the storage device. However, applying the charge upon the storage device can be change physical characteristics of the charge and ultimately increase a likelihood of device failure. Therefore, a determination can be made on how to apply the charge based upon analysis of the device, of data for retention, and the like. Raw data can be analyzed and/or estimations can be made to determine the charge.

20 Claims, 10 Drawing Sheets

LIMITED MEMORY POWER

TECHNICAL FIELD

The subject specification relates generally to memory devices and in particular to regulating power related to memory devices.

BACKGROUND

Digital storage mediums enable information to be retained and accessed at a later time. A common type of storage medium is a magnetic disk, which facilitates information to be recorded according to a magnetization pattern. Similar to other storage media, magnetic disks can be configured in a variety of different manners (e.g., Magnetoresistive Random Access Memory) as well as employed in various applications. This type of storage device is commonly used in connection with databases and analog recordings.

Storage mediums can also be used in conjunction with personal electronic devices, including cellular telephones, laptop computers, and the like. For example, a user can create a document through use of a word processing application retained upon a laptop computer. The created document can be saved upon a storage medium of the laptop computer and opened at a later time. When opened, the user can edit the document, create duplicate copies, transfer the document, designate a different storage location, and the like.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Some storage device types (e.g., at least some types of flash memory) can be programmed through holding a charge upon a portion of the device. However, there can be negative repercussions based upon holding a charge. If a charge is not held long enough and/or not strong enough, then critical data could be lost/not properly programmed. Conversely, flash memory commonly is limited in lifespan based upon overall charge intensity and number charges exposed to, such that exposure to high storage intensity and/or relatively long charges can lower a lifespan of the flash memory device.

Therefore, the disclosed innovation can analyze data for retention as well as the storage device to determine an appropriate manner in which to program the device. Specifically, an evaluation can occur upon lifespan of a storage device that can retain data, data type, estimated data usage, and data importance level. Based upon a result of the evaluation, a determination can be made (e.g., through use of a rule set) on how the storage device should be programmed. According to an alternative embodiment, there can be different pools of memory available and the determination can be upon which pool of memory to retain data based upon the aforementioned evaluation.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 1:
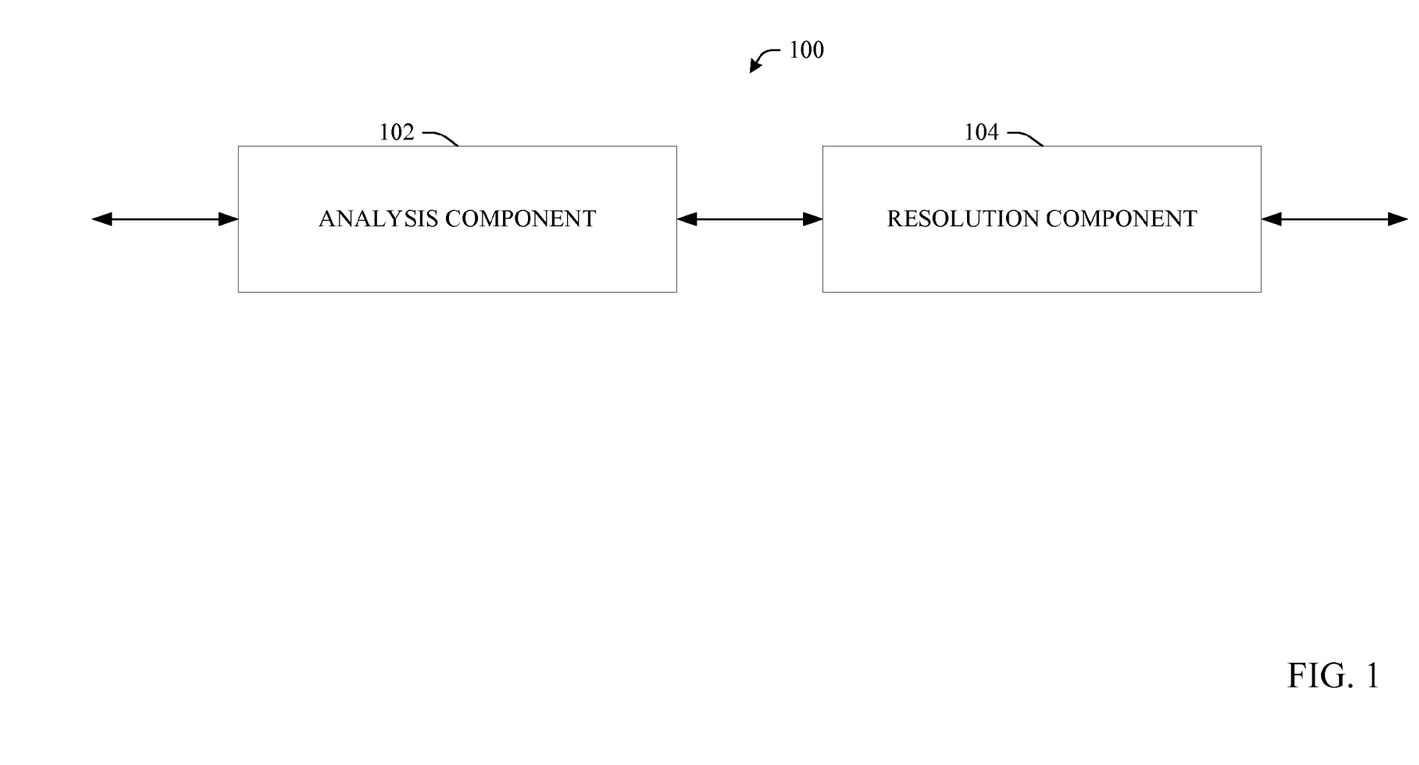
FIG. 1 illustrates a representative system for determining a manner for programming data upon a storage device in accordance with an aspect of the subject specification.

Now referring to FIG. 1, an example system 100 is disclosed for determining a manner to program information upon memory. Lifespan of at least some flash memory devices can be a function of an amount of charge subjected to the flash memory. After the flash memory is programmed for a certain amount of time, a critical failure can occur (e.g., a portion so subjected can no longer be used). However, if programming does not occur for a long enough time, then valuable information can become lost and/or not transferred to the flash memory. Therefore, the disclosed innovation can enable regulation of holding a charge upon a memory device (e.g., length of charge, intensity of charge, etc.).

A balance can be struck between improving lifespan of a storage device (e.g., flash memory) against improving save quality based on information importance. An analysis component 102 can evaluate lifespan of a storage device that can retain data, data type, estimated data usage, data importance level, or a combination thereof. An evaluation result can transfer to a resolution component 104 that can determine a manner for program for the storage device as a function of a result of operation of the analysis component 102.

In order to evaluate lifespan of the storage device, a log can be retained tracking how long a charge is held upon the storage device. If a device is closer to reaching a critical level, then it could be beneficial to be more cautious concerning long charges. Additionally, data type can be important when determining how to program a memory device. Identification can take place, such as if a file is a photograph or a document. A photograph commonly includes a multitude of pixels and loss of a pixel is not generally detrimental to potential appreciation of an image. Therefore, appreciating data type can assist in determining if a longer or shorter charge is appropriate. If data is to be commonly used, then it can be a signal of importance of data and thus signify that there should be a relatively longer charge. Moreover, sheer importance of the data can be relevant in programming a cell of a storage device. For instance, a document created by a clerk can be considered less important than a document created by an office manager and a determined importance can factor in a decision on a programming manner. Other factors can also be taken into account. For instance, if the storage device is part of a RAID (Redundant Arrays of Independent Disks) configuration, then it is likely information can be lost (e.g., there is a shorter timed charge) without major detriment since there are other copies. The resolution component 104 can balance conflicting factors, such when a file is considered important but is of a data type that can afford degradation.

According to one embodiment, the manner for program is how long a charge should be held upon at least a portion of the storage device and/or the storage device is flash memory. Various types of flash memory can be used, including NAND (e.g., logic gate), NRAM (nonvolatile random access memory), PMRAM (parallel magnetic random access memory), etc. In addition, the analysis component 102 and/or resolution component 104 can locate upon the storage device, locate upon a unit that retains the storage device, manage from a host device, be part of a third party unit (e.g., pluggable unit), etc.

Figure 2:
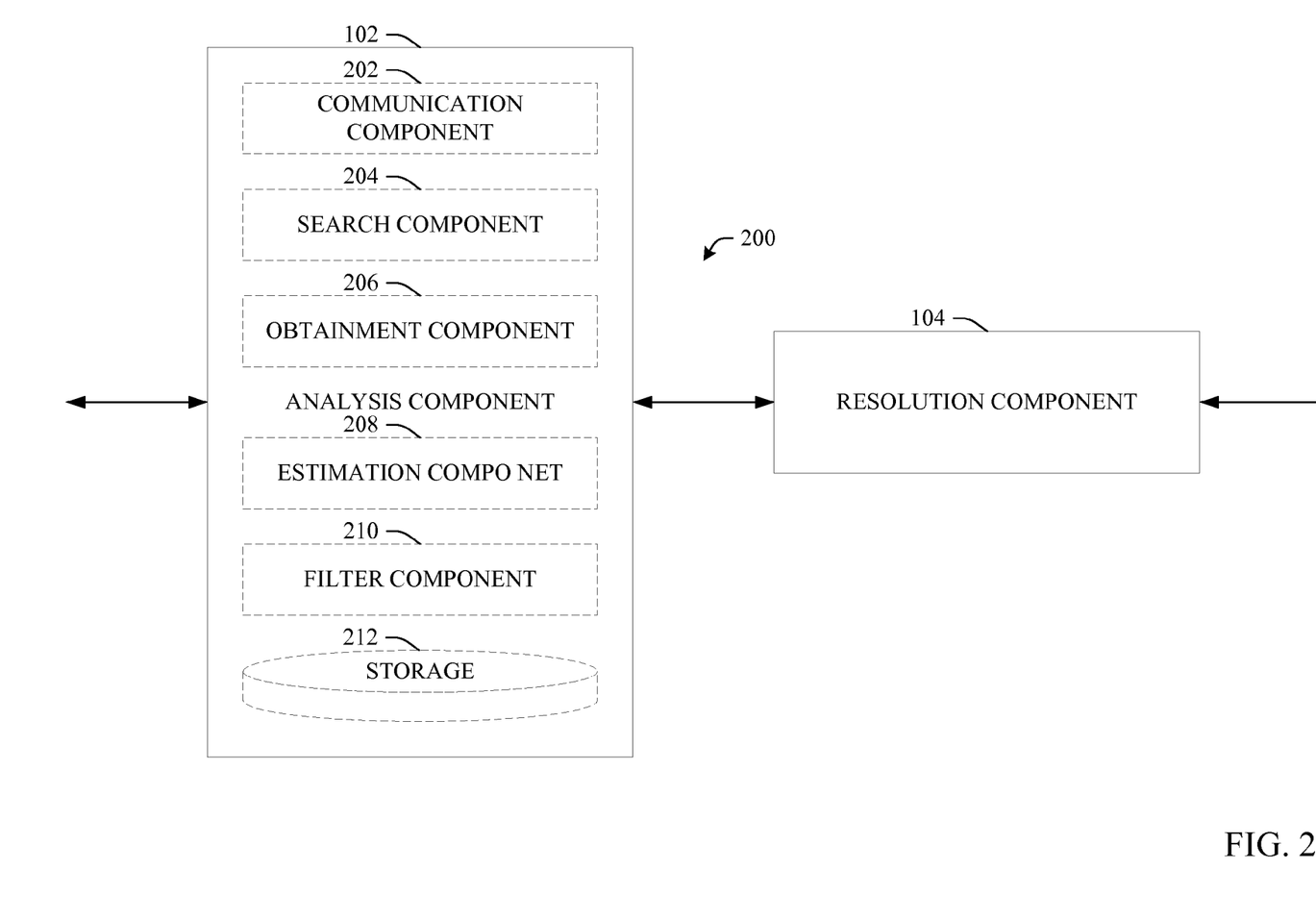
FIG. 2 illustrates a representative system for determining a manner for programming data upon a storage device with a detailed analysis component in accordance with an aspect of the subject specification.

Now referring to FIG. 2, an example system 200 is disclosed for determining a manner for programming a storage device with a detailed analysis component 102. The analysis component 102 can evaluate metadata that relates to storage of information concerning how to program the storage device. To facilitate operation, the analysis component 102 can use a communication component 202 that can engage with other devices to transfer information, such as to send a request for metadata, receiving metadata from an auxiliary source, etc. Operation can take place wirelessly, in a hard-wired manner, employment of security technology (e.g., encryption), etc. Additionally, metadata transfer can be active (e.g., query/response) or passive (e.g., monitoring of public communication signals). Moreover, the communication component 202 can use various protective features, such as performing a virus scan on collected metadata and blocking metadata that is positive for a virus. According to one embodiment, the communication component 202 facilitates collection of the data importance level from a host device (e.g., a computer).

Different locations can retain information beneficial in determining a manner for programming a storage device (e.g., a cell of the storage device). A search component 204 can be used to locate sources of information, such as when the analysis component 102 is part of the storage device an automatic search can be performed when the storage device operatively couples with a host device. In addition, the search component 204 can test accuracy of sources, resolve occurrences of multiple sources (e.g., determine data should be gathered from two sources, a primary source is designated, and the like), etc.

An obtainment component 206 can collect metadata related to lifespan of a storage device that can retain data, data type, estimated data usage, data importance level, or a combination thereof. The obtainment component 206 can evaluate a result of operation of the search component 204 and intelligently decide information to collect. Additionally, the obtainment component 206 can operatively engage with the search component 204. For instance, a determination can be made that other metadata could be beneficial (e.g., to resolve a dispute between collected metadata), the obtainment component 206 can request that the search component 204 locate new information.

Based upon at least a portion of the collected metadata, approximations can be made related to the collected metadata by an estimation component 208. For example, a cell of the storage device can have been subjected to a charge for 'x' amount of time. The estimation component 208 can perform calculations to approximate an estimation lifespan remaining with the cell.

It is possible that the obtainment component 206 collects a massive amount of metadata and additional information produced by the estimation component 208 can make operate with the information detrimental to the system 200. For instance, processing all the metadata and information can consume valuable system resources. Therefore, a filter component 210 can limit information that passes to a resolution component 104, collected by the obtainment component 206, approximations made by the estimation component 208, and the like.

Different pieces of information, such as collected metadata, component operating instructions (e.g., communication component 202), source location, components themselves, etc. can be held on storage 212. Storage 212 can arrange in a number of different configurations, including as random access memory, battery-backed memory, hard disk, magnetic tape, etc. Various features can be implemented upon storage 212, such as compression and automatic back up (e.g., use of a RAID configuration). In addition, storage 212 can operate as memory that can be operatively coupled to a processor (not shown) and can implement as a different memory form than an operational memory form. The system 200 can use the resolution component 104 to determine a manner for program for the storage device as a function of a result of operation of the analysis component 102.

Figure 3:
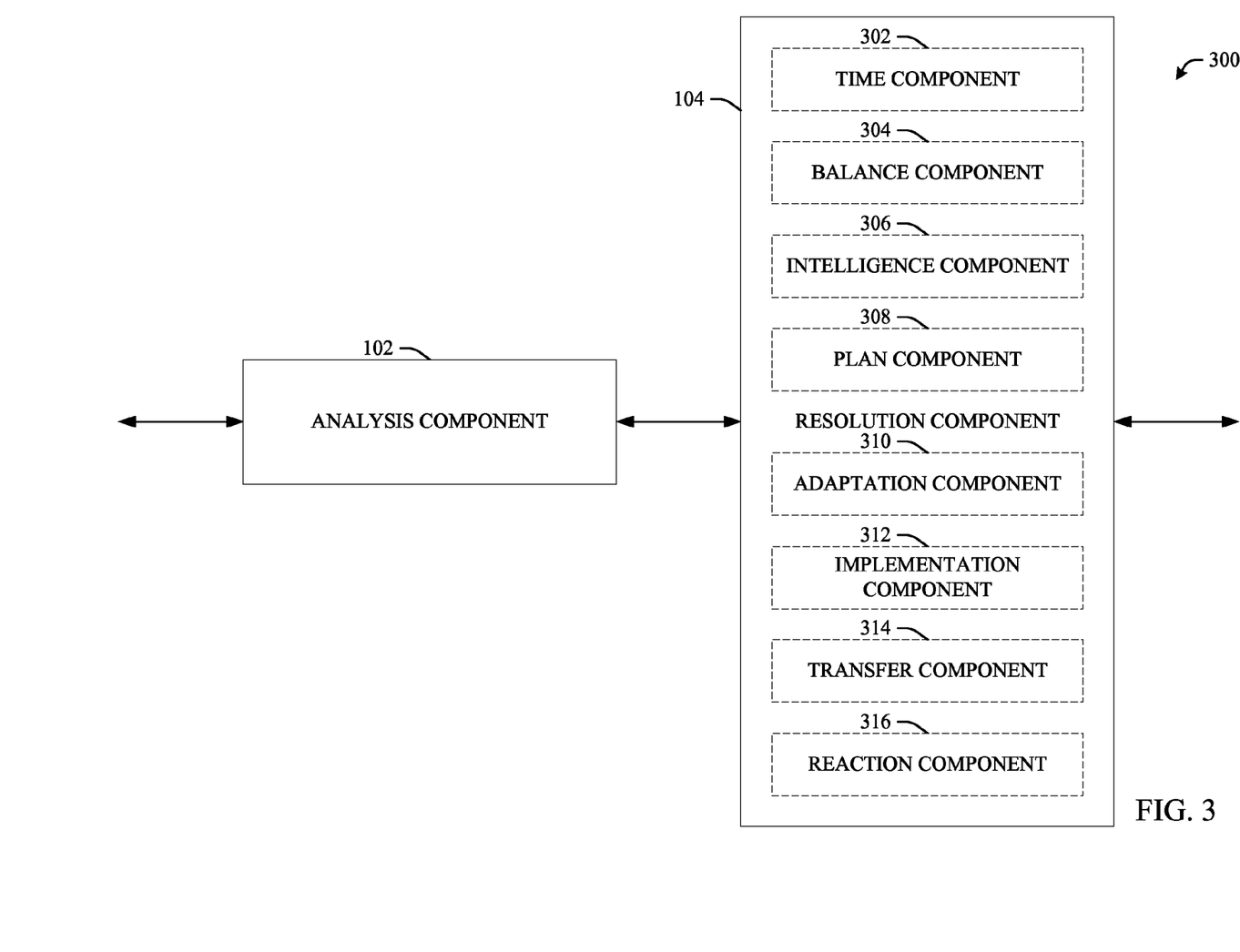
FIG. 3 illustrates a representative system for determining a manner for programming data upon a storage device with a detailed resolution component in accordance with an aspect of the subject specification.

Now referring to FIG. 3, an example system 300 is disclosed for determining a manner for programming a storage device with a detailed resolution component 104. An analysis component 102 can evaluates lifespan of a storage device that can retain data, data type, estimated data usage, data importance level, or a combination thereof, as well as other information (e.g., storage device information, data for storage information, contextual circumstances, etc.). A resolution component 104 can determine a manner for program for the storage device as a function of a result of operation of the analysis component 102.

It can be important in programming a storage device that how long information is to be retained is considered. Storage mediums can lose information over time (e.g., over time, a state of a cell can be difficult to determine). A time component 302 can estimate how long data should be retained; a result of the estimation can be used by the resolution component 104 to determine the manner for program. For example, if data is to be retained for a relatively long period of time (e.g., digital copy of a last will and testament), then there can be holding of a charge upon the storage device for a longer time.

The analysis component 102 can produce differing results and a balance component 304 can be employed to weigh the results. For instance, a document can be considered important, but of a type that can withstand a level of information loss over time. The balance component 204 can rectify the conflicting factors, such as assigning the factors different mathematical values and aggregating the values, where the aggregated value correlates to a time and/or intensity for holding a charge.

An intelligence component 306 can be used that uses a rule set to determine lifespan of a storage device that can retain data, data type, estimated data usage, data importance level, or a combination thereof based upon at least a portion of the collected metadata (e.g., collected by the obtainment component 206 of FIG. 2). The intelligence component 306 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the intelligence component 306 can also include methods for capture of logical relationships such as theorem provers or more heuristic rule-based expert systems. The intelligence component 306 can be represented as an externally pluggable component, in some cases designed by a disparate (third) party.

According to one embodiment, a schema can be used to manage programming of the storage device. A plan component 308 can produces a schema, the schema can be used to determine the manner for program. Thus, through the schema a policy can be used that allows for quick decisions to be made with regard to programming a cell of the storage device.

The schema can be constructed based off estimations; however, it is possible that the estimations are incorrect and/or information used to make the estimations is out of date. An adaptation component 310 can observe operation of the system 300 and associated elements (e.g., the storage device, a host system, and the like) and alter the schema based upon observation of the storage device. If the system 300 functions at least in part upon the storage device, then an implementation component 312 can programs the storage device with the determined manner for program. If the system 300 functions at least in part upon the host device, a third party device, and the like, then a transfer component 314 can notify the storage device of the manner for program. Regardless of how the program occurs (e.g., through direct implementation, through instruction set, if the program does not occur, etc.) a reaction component 316 can collect feedback that pertains to the storage device based upon an attempted storage device program. For instance, if information is not retained on a charge length that is expected to retain the information, then the reaction component 316 can make the observation and the adaptation component 310 can modify the schema based upon the observation.

Figure 4:
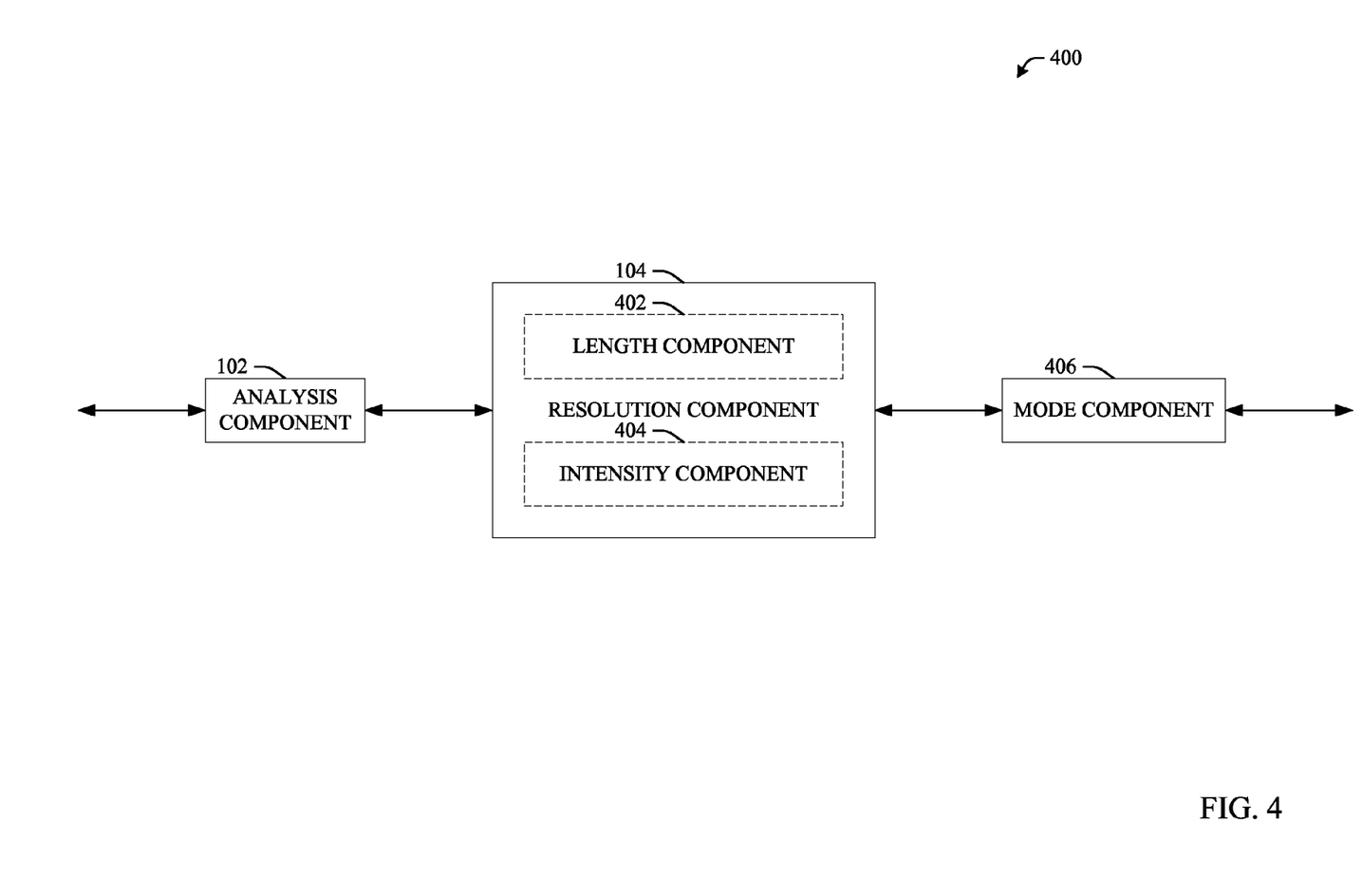
FIG. 4 illustrates a representative system for determining a manner for programming data upon a storage device with a mode component in accordance with an aspect of the subject specification.

Now referring to FIG. 4, an example system 400 is disclosed for programming information upon a storage device, commonly the storage device is flash memory. An analysis component 102 can evaluate metadata that relates to data retention in relation to a manner for programming the storage device with the data. The analysis component 102 can operate as means for analyzing lifespan of a storage device that can retain data, data type, estimated data usage, and data importance level.

A resolution component 104 can determine a manner for programming a storage device, commonly a manner for programming individual storage device cells. Various characteristics for programming can be taken into account, including when programming is to occur, what unit performs programming, and the like. A manner for programming can also include how long a charge is held and/or how intense of a charge is used. A length component 402 can determine how long to hold the charge while an intensity component 404 can determine how intensely a charge can be applied. The resolution component 104 can synchronize operation among the length component 402 and intensity component 404 (as well as among other modules). In order to achieve a state with a desired likelihood of success, the resolution component 104 can coordinate both length of charge and intensity. The coordination can operate as a function of power consumption, speed, and the like. The length component 402 can operate as means for determining how long a charge should be held upon the storage device as a function of a result of the analysis. The intensity component 404 can implement as means for determining how intense the charge should be held upon the storage device as a function of a result of the analysis.

While at least a portion of the system 400 can implement upon the storage device, the system 400 can be part of a host device that manages memory (e.g., the storage device is part of computer system, where the computer system operates as the host device). The storage device can operate in different modes that are facilitated by a mode component 406. For instance, the storage device can operate in four modes: short and intense, long and intense, short and not intense, and long and not intense. Depending on an outcome of the resolution component 104, the mode component 406 can change a mode of the storage device. For instance, if the resolution component 104 determines that information is highly important and there should be a relatively strong likelihood of data being retained (e.g., through use of the length component 402 and/or intensity component 404), then the mode component 406 can enter the storage device into the long and intense mode. The mode component 406 can function as means for instructing the storage device to enter a mode consistent with the determined length and determined intensity.

Figure 5:
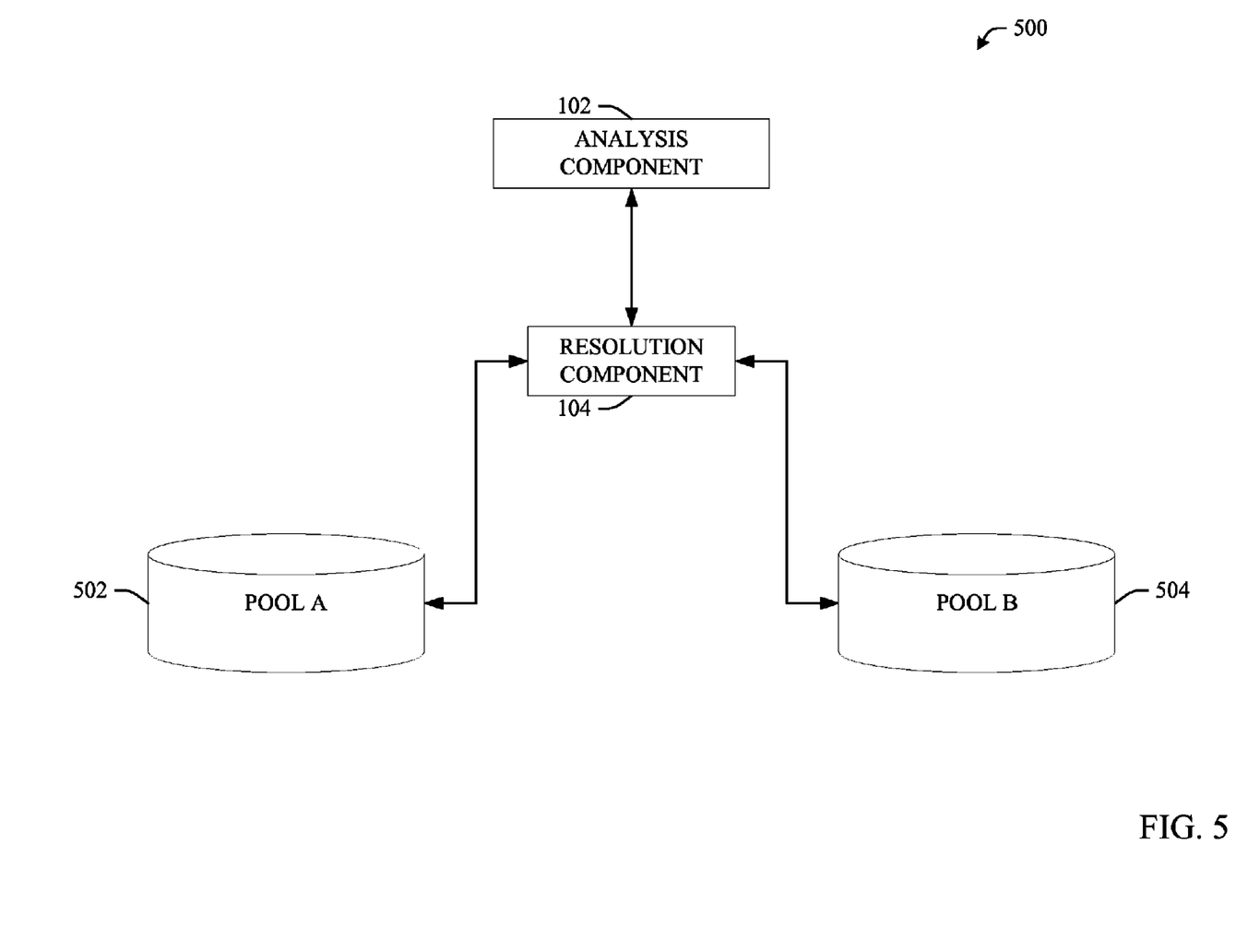
FIG. 5 illustrates a representative system for storage device selection in accordance with an aspect of the subject specification.

Now referring to FIG. 5, an example system 500 is disclosed for determining a fate of data for programming upon a storage medium. Two different pools of memory can exist in a computer system: pool A 502 and pool B 504 (e.g., both pools are of flash memory), where the different pools have different memory characteristics. For instance, pool A 502 can be configured to retain information over several years without loss of information while pool B 504 can be configure to retain information over several months.

An analysis component 102 can evaluate lifespan of a storage device that can retain data, data type, estimated data usage, data importance level, or a combination thereof. A resolution component 104 can determine a location for storing the data as a function of a result of the evaluation of the analysis component 102. For instance, data for retention can be a highly valuable document, such as a tax document for a company that represents information over a calendar year. Even though the document is important, since the value of the document can dissipate dramatically after several months (e.g., after a tax season), the resolution component 104 can determine that the tax document should be retained upon pool B 504.

Figure 6:
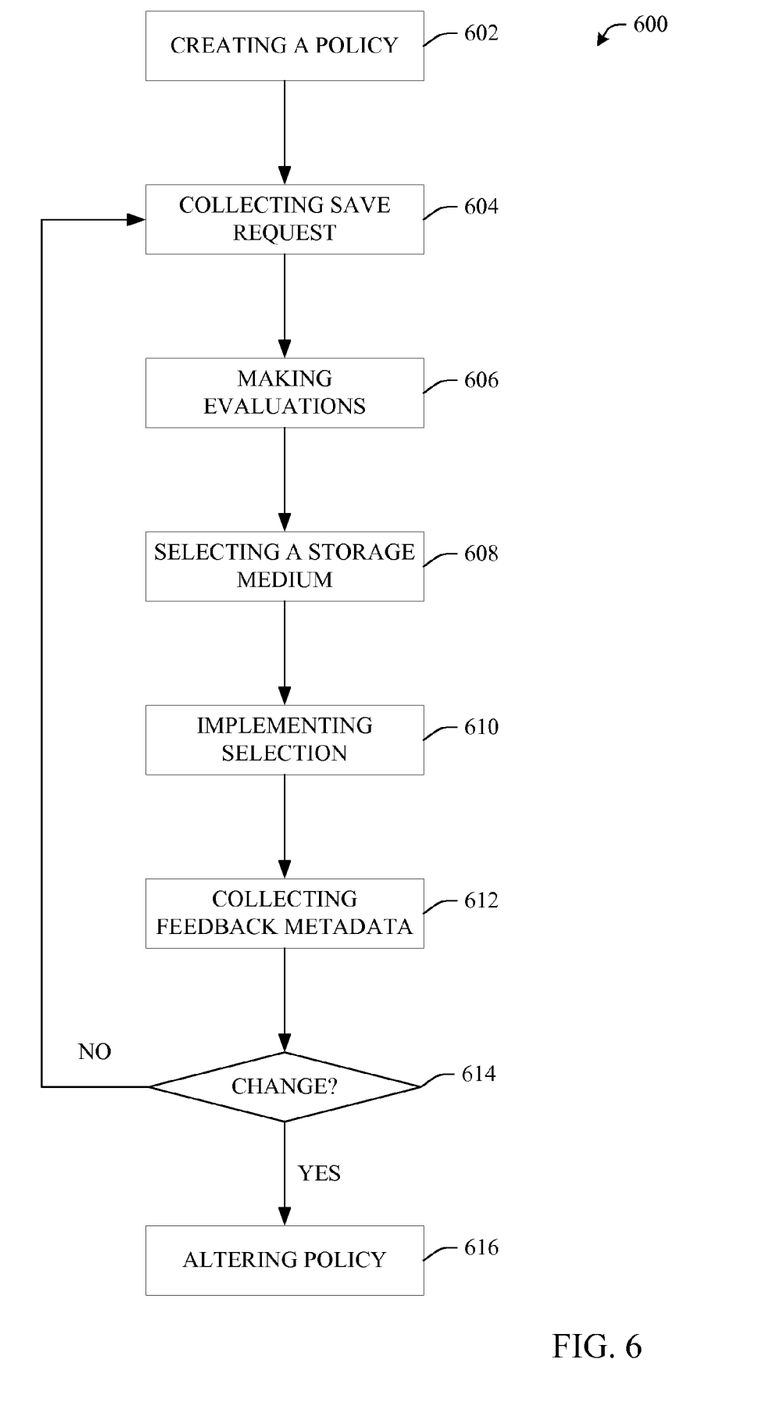
FIG. 6 illustrates a representative methodology for programming at least one storage medium in accordance with an aspect of the subject specification.

Now referring to FIG. 6, an example methodology 600 is disclosed for retaining data upon a storage medium. At action 602, a policy can be created for regulating storage of information. The policy can regulate a manner for programming (e.g., a length of holding a charge, an intensity of holding a charge, and the like) as well as regulate how to select an appropriate storage device. Commonly, selection is based upon an amount of time for retaining data, where different storage devices can hold data for different lengths of time.

A request to save data can be collected at event 604; the request can originate from a user, an automatic program (e.g., an autosaving feature), and the like. According to one embodiment, a storage device can be scanned for information that is near a critical storage time (e.g., a rated amount of time the storage device can hold information without significant loss). Identified information can be evaluated to determine if a re-save should occur, thus resetting a counter.

At action 606 there can be evaluating type, estimated usage, importance level, or a combination thereof for a dataset. There can also be selecting of a storage medium for retention of the dataset from a group of at least two storage mediums as a function of a result of the evaluation at act 608. In addition to selecting a storage medium, a manner for programming data upon the storage medium can be determined. Conversely, a manner for programming can be selected and a device that suits the manner (e.g., best suits the manner) can be selected at act 608. According to one implementation, the group of at least two storage mediums includes a long-term medium and a short-term medium and/or the long-term medium or the short-term medium can be flash memory.

Additionally, the evaluations of action 606 can include analyzing available storage mediums, where analysis of the mediums is also used for selection. The selection can be implemented at event 610 and a check can be performed to determine if implementation is successful. If implementation is not successful, then multiple attempts can be made and/or if a set number of attempts fails, then there can be a re-occurrence of act 608 to select a different storage medium and the different selection can be implemented at event 610.

Feedback can be gathered at action 612 that pertains to the retained data and/or storage mediums. For example, a storage medium could be poorer at retaining data than anticipated (e.g., data is lost in weeks when months are expected). Since feedback metadata can become cumbersome (e.g., there is too much available to realistically process), it is possible for action 612 to function as selectively obtaining the metadata.

A check 614 can determine if the collected metadata is substantial enough to warrant a change. If the metadata is substantial enough, then an appropriate change can be determined and the policy can be altered at action 616. Action 616 can include altering the policy based upon metadata that concerns the group of at least two storage mediums. If the change is not substantial enough and/or there is no change, then the methodology 600 can return to event 604.

Figure 7:
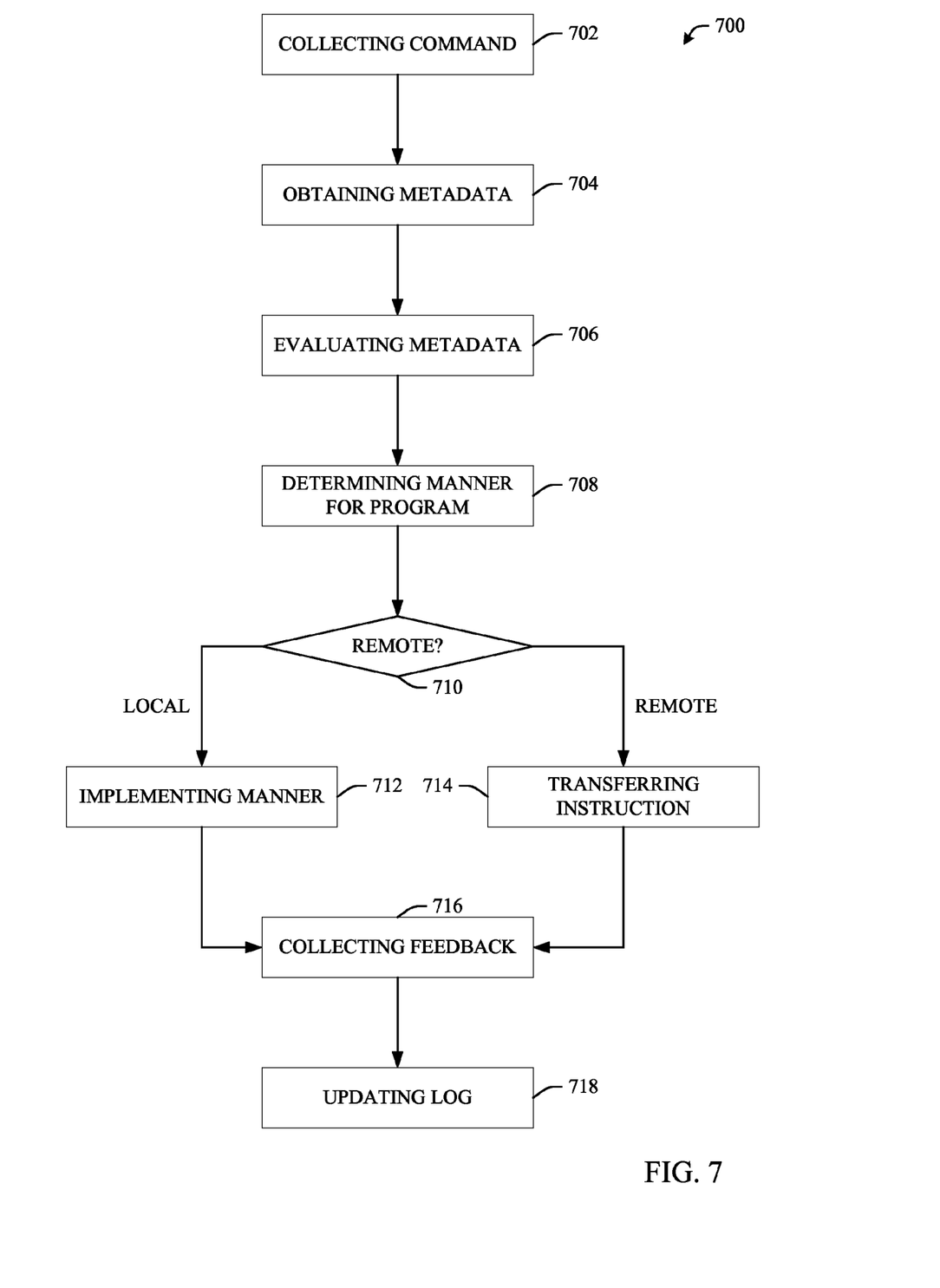
FIG. 7 illustrates a representative methodology for programming a storage medium in accordance with an aspect of the subject specification.

Now referring to FIG. 7, an example methodology 700 is disclosed for determining a manner in which to use in programming a storage device with information. Commonly, to program a storage device, a charge is held upon the device such that the value retained changes from a 0 to a 1 or from a 1 to a 0. A command to alter the retained value can be collected at action 702, commonly initiated from a user or an automatic command-generating module. Action 702 can include analyzing the command, such as to identify that a dataset is designated for retention.

Metadata that pertains to a storage device and/or data for retention can be obtained at event 704. Evaluation of at least a portion of the data can take place at action 706, including lifespan of a storage device that can retain data, data type, estimated data usage, data importance level, or a combination thereof. It is possible that there is so much metadata that valuable system resources can be wasted evaluating all the metadata. Therefore, as evaluation occurs a check can take place to determine if there is enough of a result to make an accurate determination. If there is an accurate enough result, then evaluation can stop and the methodology 700 can continue; if there is not an accurate enough result, then evaluation can continue.

At act 708 there can be determining a manner for program, commonly based upon at least a portion of the evaluation result. Act 708 can include determining a length of time for retention of the dataset. A check 710 can occur to determine if the storage medium is local or remote. If the storage medium is local, then the appropriate manner can be implemented at action 712. Action 712 can include placing the storage medium in a mode to save the data as determined (e.g., the dataset is saved for a time the memory is in the mode, the mode retains information less reliability, etc.) or using a dedicated command sequence to retain the dataset as determined (e.g., the command sequence limits time a dataset is retained). If the storage medium is not local, then an instruction set with particulars of the manner can be generated and transferred to an appropriate unit at action 714.

Feedback of implementation of the manner (e.g., performed through action 712, performed by a remote device that collects the instructions of action 714, and the like) can be collected at event 716. The feedback can include not only implementation, but also responses from a remote device, such as failure to implement the proposed manner. A log can be updated and/or created at event 718 with at least a portion of the collected feedback. For instance, how long a cell is exposed can bring the cell closer to critical failure and other choices of cells and/or determination of manners can be influenced by the exposure (e.g., increase in exposure can make a cell less likely to be used again). According to one embodiment, determination of the manner for program can attempt to balance exposure among cells and/or storage devices (e.g., attempt to program such that cell exposure is even).

Figure 8:
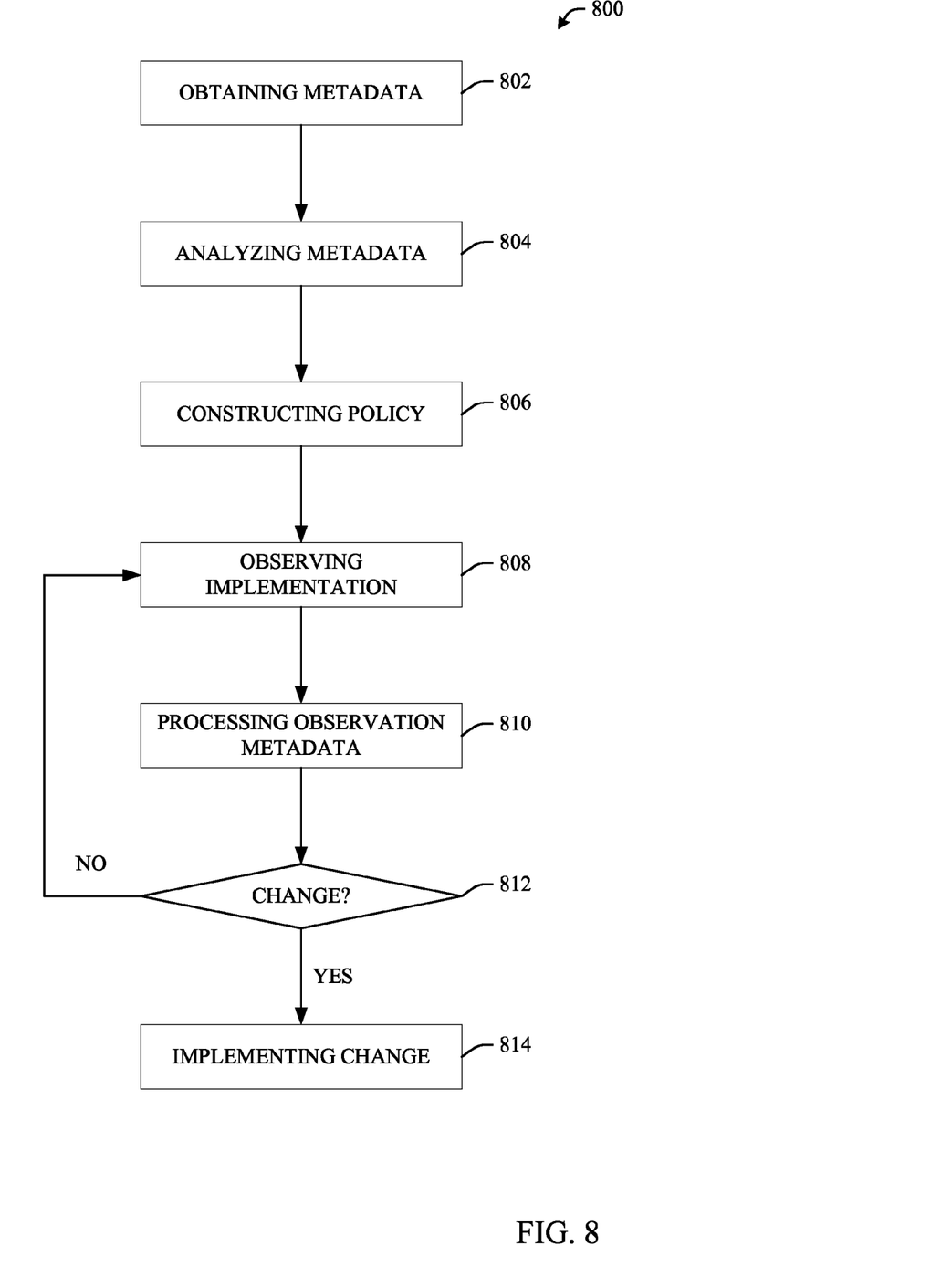
FIG. 8 illustrates a representative policy generation methodology in accordance with an aspect of the subject specification.

Now referring to FIG. 8, an example methodology 800 is disclosed for generating a policy related to retaining information upon a storage medium. Metadata of a system can be obtained at action 802, such as available storage devices, characteristics of the devices, and the like. Other metadata can include information that is retained and contextual importance (e.g., value of information commonly retained). Analysis can occur of the metadata at event 804 and based upon a result of the analysis a policy can be constructed at action 806.

An implementation of a determined manner for programming can occur (e.g., the constructed policy is used in determining the manner) as discussed in the subject specification. The determined manner can be implemented and observation of the implementation can take place through act 808. Metadata related to the observation can be processed at action 810, such as determining an outcome of the implementation, contextual factors related to the implementation, and the like.

A check 812 can occur to determine if there should be a change regarding the policy (e.g., the policy should be changed). Observation metadata can be analyzed and comparisons can be made against a desired outcome of the implementation. If a change should occur, is desirable to occur, and the like, then the change can be implemented at act 814. However, if there is to be no change, then the methodology 800 can continue to observe implementation. It is to be appreciated that observing implementation can occur while action 810, check 812, and/or act 814 operates.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 9:
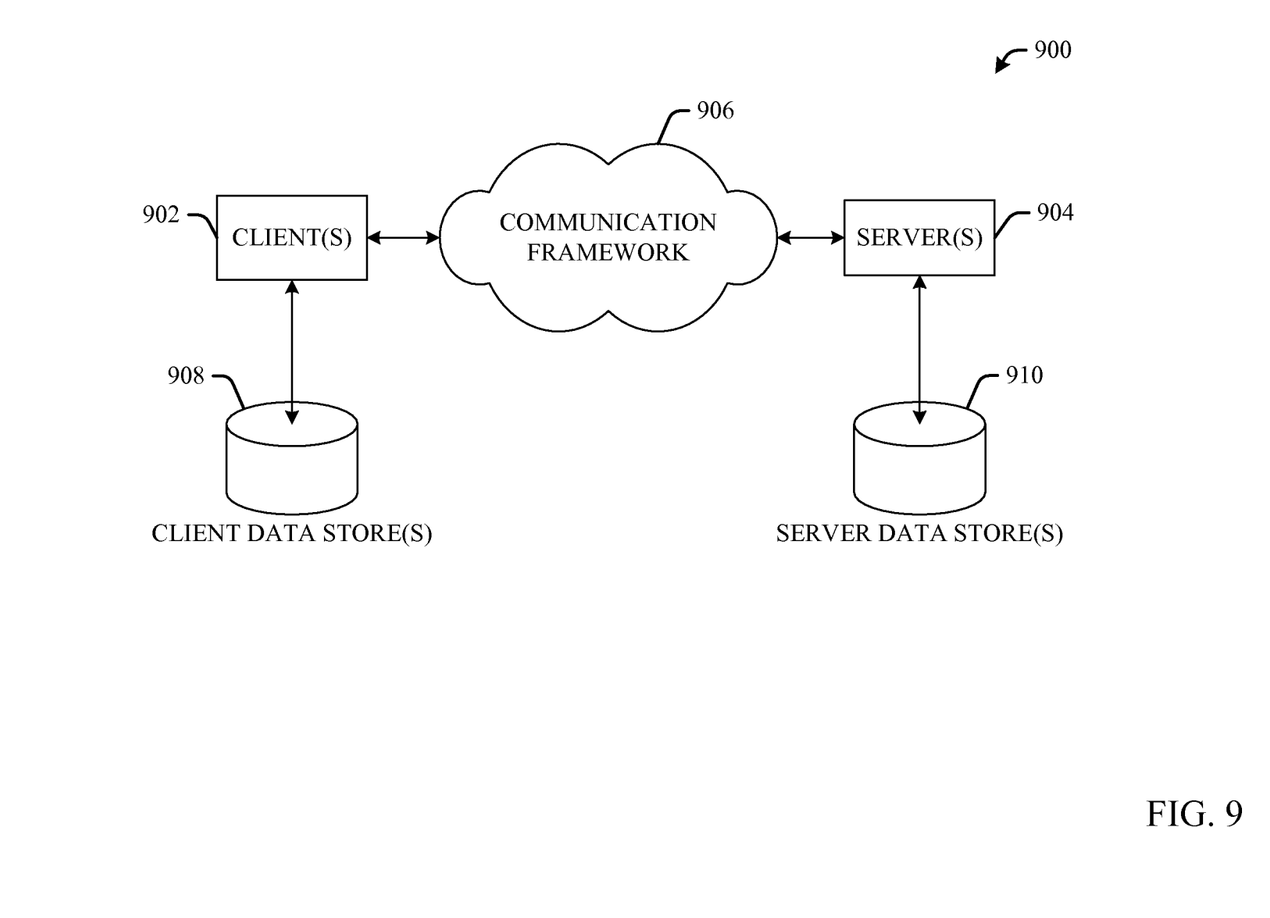
FIG. 9 illustrates an example of a schematic block diagram of a computing environment in accordance with an aspect subject specification.
Figure 10:
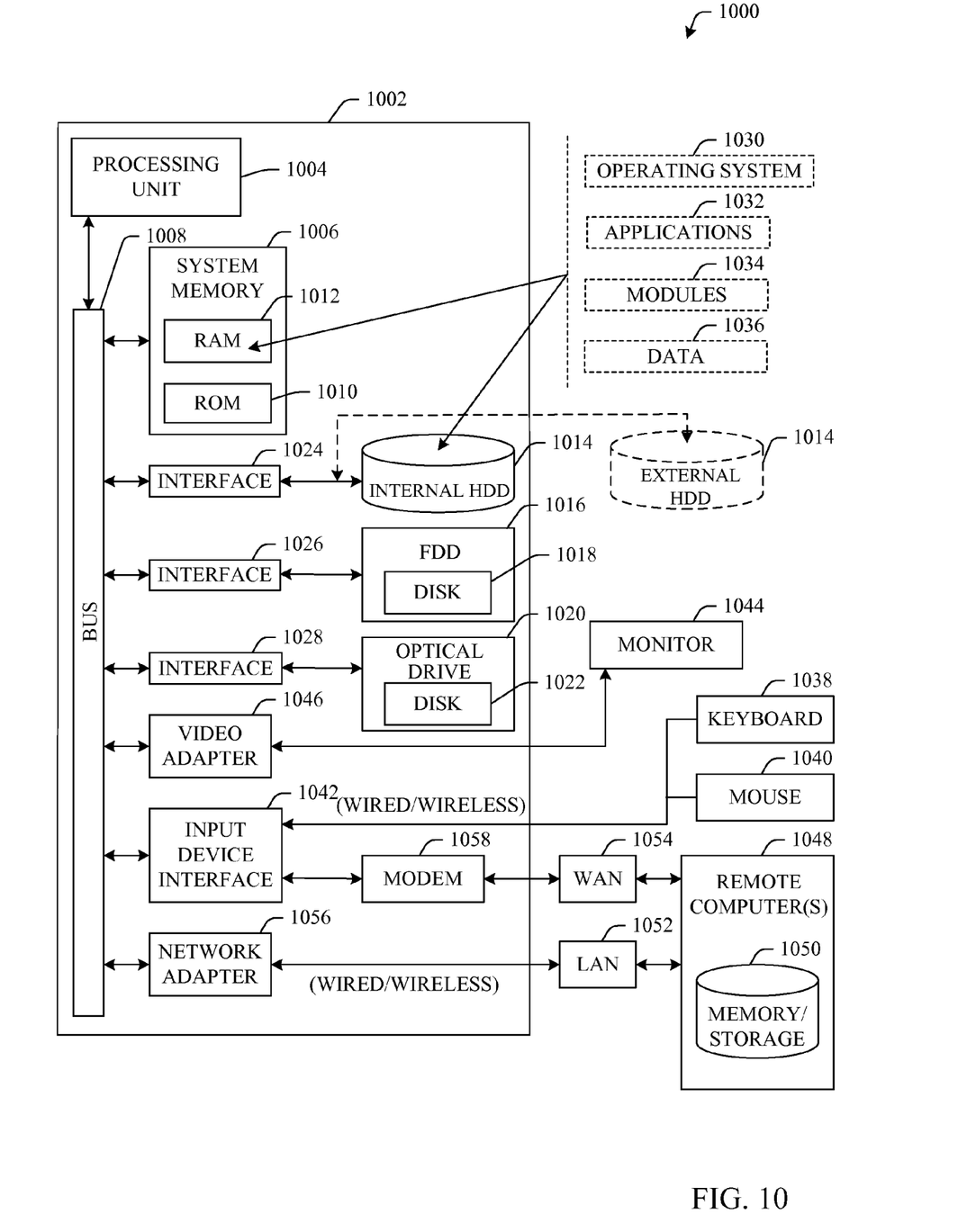
FIG. 10 illustrates an example of a block diagram of a computer operable to execute the disclosed architecture.

In order to provide a context for the various aspects of the disclosed subject matter, FIGS. 9 and 10 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 9, there is illustrated a schematic block diagram of a computing environment 900 in accordance with the subject specification. The system 900 includes one or more client(s) 902. The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware and/or software (e.g., threads, processes, computing devices). The servers 904 can house threads to perform transformations by employing the specification, for example. One possible communication between a client 902 and a server 904 can be in the form of a data packet adapted to be transmitted between two or more computer processes. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

Referring now to FIG. 10, there is illustrated a block diagram of a computer operable to execute the disclosed architecture. In order to provide additional context for various aspects of the subject specification, FIG. 10 and the following discussion are intended to provide a brief, general description of a suitable computing environment 1000 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 10, the example environment 1000 for implementing various aspects of the specification includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors or proprietary specific configured processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the specification can be implemented with various proprietary or commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are example and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising: one or more processors; and memory, communicatively coupled to the one or more processors, to store:
    an analysis component that evaluates a lifespan of a storage device, the lifespan of the storage device being a function of an amount of a programming charge subjected to the storage device;
    an intensity component that determines an intensity of the programming charge that is to be held upon the storage device;
    a weighting component that weights data based on a relative importance of each portion of the data, the relative importance of each portion of the data indicating an accepted level of information loss over time; and
    a resolution component that, based at least in part on the lifespan of the storage device, the intensity of the programming charge, and the weighted data, determines a manner in which the storage device is to be programmed.

2. The system of claim 1, wherein the manner in which the storage device is to be programmed is based at least in part on a length of the programming charge that is to be held upon at least a portion of the storage device.

3. The system of claim 1, wherein the storage device is a flash memory.

4. The system of claim 1, wherein the memory further stores a time component that estimates an amount of time that the data is to be retained, the estimated amount of time being used by the resolution component to determine the manner in which the storage device is to be programmed.

5. The system of claim 1, wherein the memory further stores an obtainment component that collects metadata related to the lifespan of the storage device.

6. The system of claim 5, wherein the memory further stores a communication component that facilitates collection of a data importance level from a host device.

7. The system of claim 5, wherein the memory further stores an intelligence component that uses a rule set to determine the lifespan of the storage device based upon at least a portion of the collected metadata.

8. The system of claim 1, wherein the memory further stores a plan component that produces a schema that is used to determine the manner in which the storage device is to be programmed.

9. The system if claim 8, wherein the memory further stores an adaptation component that alters the schema based upon observation of the storage device.

10. The system of claim 1, wherein the memory further stores an implementation component that programs the storage device.

11. The system of claim 10, wherein the memory further stores a reaction component that collects feedback that pertains to the storage device based upon the manner in which the storage device is to be programmed.

12. The system of claim 1, wherein the memory further stores a transfer component that notifies the storage device of the manner in which the storage device is to be programmed.

13. A method, comprising:
evaluating, by a computing device, a type, an estimated usage, an importance level, or a combination thereof for a dataset;
selecting, by the computing device and based at least in part on the evaluating, a storage medium for retention of the dataset from a group of at least two storage medium;
weighting, by the computing device, the dataset based on an importance level of each portion of the dataset;
determining, by the computing device, an intensity of a programming charge that is to be held upon the storage medium based at least in part on the weighted dataset; and determining, by the computing device and based at least in part on the dataset, a lifespan of the storage medium by retaining a log that tracks an amount of time the programming charge is held upon the storage medium.

14. The method of claim 13, wherein the group of at least two storage mediums includes a long-term medium and a short-term medium.

15. The method of claim 13, further comprising: identifying that the dataset is designated for retention; determining a length of time for retention of the dataset; and
placing the storage medium in a mode to save the dataset or using a dedicated command sequence to retain the dataset.

16. The method of claim 13, wherein selection of the storage medium for retention is based at least in part on use of a policy.

17. The method of claim 16, further comprising altering the policy based upon metadata that relates to the group of at least two storage mediums.

18. The method of claim 17, further comprising selectively obtaining the metadata.

19. A system, comprising:
one or more processors,
memory configured to store computer-executable instructions that, when executed by the one or more processors, cause the one or more processors to perform operations comprising:
determining and analyzing a lifespan of a storage device that is configured to retain data, data type, estimated data usage, and data importance level;
weighting the data based on a relative importance of each portion of the data, the relative importance of each portion of the data indicating an accepted level of information loss over time;
determining, based at least in part on the lifespan, a length in which a programming charge is to be held upon the storage device;
determining an intensity of the programming charge that is to be held upon the storage device based at least in part on the weighted data; and
instructing the storage device to enter a mode consistent with the determined length and the determined intensity.

20. The system of claim 19, wherein the storage device is a flash memory.

* * * * *